United States Patent [19]

Blair

[11] 4,152,576

[45] May 1, 1979

[54] LOW VOLTAGE WELDING CIRCUIT WITH NON-CONDUCTIVE GROUND CONNECTOR

[75] Inventor: Robert H. Blair, Bay City, Mich.

[73] Assignee: Resistance Welder Corporation, Bay City, Mich.

[21] Appl. No.: 790,311

[22] Filed: Apr. 25, 1977

[51] Int. Cl.² ............................................. B23K 9/10
[52] U.S. Cl. ................................ 219/130.1; 337/19; 361/91
[58] Field of Search ................. 361/38, 39, 41, 124, 361/91; 337/28, 32, 17, 19; 219/131 R, 130.1; 338/20, 21

[56] References Cited

U.S. PATENT DOCUMENTS

| 1,402,037 | 1/1922  | Armor ........................................ 337/32 |
| 1,457,249 | 5/1923  | Janson et al. ........................... 361/124 |
| 2,295,379 | 9/1942  | Beck et al. ............................... 338/21 |
| 2,338,109 | 1/1944  | Green ...................................... 361/124 |
| 2,430,206 | 11/1947 | Beck et al. ............................... 361/124 |
| 2,914,742 | 11/1959 | Heath ...................................... 338/21 |
| 3,926,916 | 12/1975 | Mastrangelo ............................ 338/20 |
| 3,975,664 | 8/1976  | Baumbach ............................... 337/32 |
| 4,041,543 | 8/1977  | Pasculle et al. ......................... 361/124 |

*Primary Examiner*—Arthur T. Grimley
*Assistant Examiner*—Clifford C. Shaw
*Attorney, Agent, or Firm*—Learman & McCulloch

[57] ABSTRACT

A protective ground connector for establishing a direct ground connection in response to a fault voltage in a welding circuit. A pair of smooth-faced metal blocks are clamped in face-to-face relationship with each other with a relatively thin shim of electric insulating material clamped between the opposed faces of the blocks. One of the blocks is electrically connected to a circuit to be monitored, the other block is electrically connected to ground. The electrical characteristics of the shim are such as to electrically insulate the two blocks from each other in the face of normal circuit voltages and to break down in response to a fault voltage in the monitored circuit to thereby establish a direct ground connection.

8 Claims, 3 Drawing Figures

LOW VOLTAGE WELDING CIRCUIT WITH NON-CONDUCTIVE GROUND CONNECTOR

BACKGROUND OF THE INVENTION

The present invention is especially adapted for use as a protective ground connection in a welding circuit and particularly direct current welding equipment where low impedence current paths can exist through mechanical components of the machinery. Particularly in automated welding equipment, it is difficult to maintain continuous integrity of electrical insulation between the welding current carrying circuit and the relatively complex mechanical parts of the apparatus under normal working conditions. Dust, metal chips, moisture, high temperatures and vibration all present the possibility of electric failures which can create electrical shock hazards to the machine operator. High to low transformer failures can apply the high primary transformer voltage directly to the secondary circuit. Even when the workpieces are grounded, the ground is only operative during welding periods and is not secure enough to protect personnel against transformer high to low failure. Where a secure ground is placed on the power supply for safety purposes, a parallel current path in the mechanical components is created which can jeopardize bearings and other movably engaged surfaces.

The present invention is especially directed toward the provision of a normally non-conductive connector which in response to a voltage fault in a monitored circuit will immediately establish a direct ground connection to the circuit.

SUMMARY OF THE INVENTION

A non-conductive ground connector embodying the present invention takes the form of a pair of smooth faced metallic blocks, preferably of steel having polished opposed facing surfaces. A shim of uniform thickness, preferably of the order of 0.001 inch, is clamped between the opposed faces of the blocks to electrically insulate the blocks from each other. One of the blocks is connected to a circuit to be monitored, while the other block is connected to electrical ground. The shim is designed to electrically insulate the two blocks from each other as long as the voltage in the circuit into which it is connected remains below a predetermined normal voltage. In the event of a fault voltage in the monitored circuit, the shim breaks down electrically, with the attendant high flow of current between the two opposed block faces fusing the two blocks to each other to provide a direct electrical connection from the circuit to ground.

Other objects and features of the invention will become apparent by reference to the following specification and to the drawings.

IN THE DRAWINGS

Figure 2:
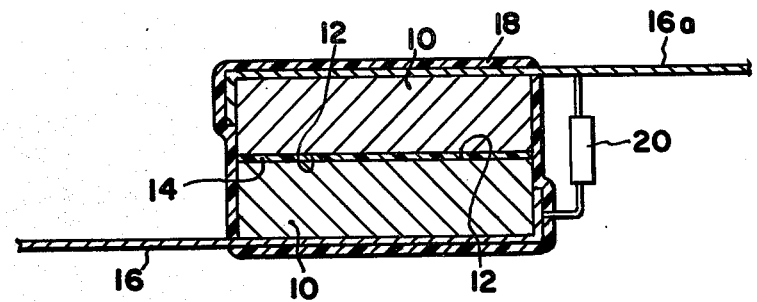
FIG. 2 is a detailed cross sectional view of a connector embodying the present invention.

Referring first to FIG. 2, a connector embodying the present invention includes a pair of steel blocks 10 which typically may have dimensions of 2 inches × 1¼ inches × ½ inch. The two faces 12 of the blocks 10 which will face each other when the connector is assembled are ground and polished to a high surface finish which approaches the surface finish of glass and may be termed glass-like. In the assembled relationship shown in FIG. 2, the opposed faces 12 of the blocks are separated from each other by a relatively thin shim 14 of electric insulating material. Shim 14 is formed from commercially available plastic shim stock, such as for example cellulose tri-acetate, because this plastic shim stock is of highly uniform thickness. In an exemplary assembly, for example, shim 14 may be uniformly of 0.001 inch thickness and formed of what is known as precision plastic shim stock, the material of such stock being cellulose tri-acetate. While the material and thickness of the shim 14 may vary in different applications, the 0.001 inch thick cellulose tri-acetate has been found to be highly satisfactory for use in conjunction with welding circuits which normally operate on a secondary voltage of 6 to 12 volts, it having been found that such shim stock will electrically break down in the face of a fault voltage of approximately 50 volts in the secondary circuit. The shim will for any welding operation always be below 0.002 inches in thickness.

The spacing established between the blocks by shim 14 should preferably be small enough so that upon electrical breakdown, current flow across the narrow gap between the blocks is sufficient to weld or fuse the two blocks to each other. Spacings of, and shim thicknesses, between 0.00050 and 0.00125 inches represent a typical range of practical operating spacings. Typically, in the specific example described above, electrical breakdown will result in the fusing of the two blocks over a circle of about ¼ inch in diameter dependent on the situation.

Conductor elements, preferably in the form of copper straps 16 and 16a, are mechanically and electrically fixedly connected to each of blocks 10, the strap 16 connecting to a current path conductor on the machine and the strap 16a connecting to ground (the machine frame). The blocks and shim are held in assembled relationship to each other by an enclosing jacket of electrical insulating material 18 which may, for example, be applied as a heat shrinkable plastic tubing. Alternatively, the assembly may be enclosed by glass tape coated with a heat-cured liquid plastic, i.e. polyurethane. In any event, the whole surface is covered to provide, in effect, a closed package. In embodiments where capacitance currents are present, it is desirable to bypass shim 14 with an electrical resistor, such as 20; and normally in welding circuits a resistance of 10–25 ohms will suffice to ground the capacitance current present. Such a fixed resistor will prevent voltage build-up from capacitance charging of the transformer secondary coils.

Figure 1:
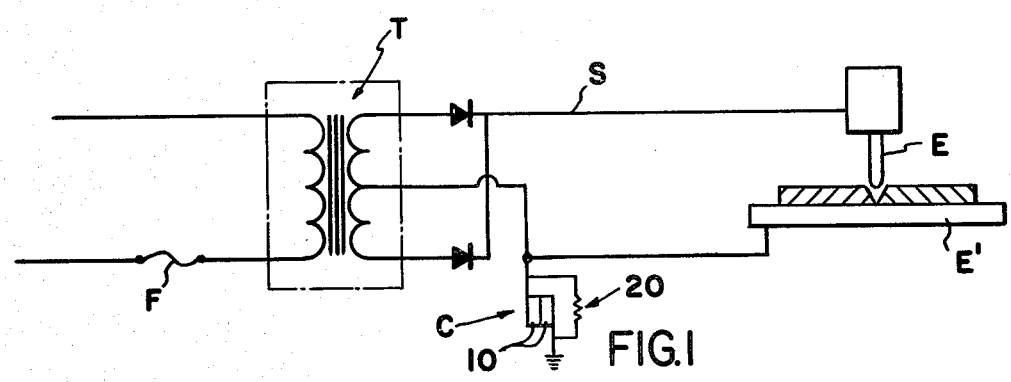
FIG. 1 is a schematic electrical diagram of an exemplary circuit embodying the present invention.

A typical installation of the connector of FIG. 2 is schematically illustrated in FIG. 1, in which the connector, indicated generally at C, is electrically connected between a suitable point in the secondary S of a D.C. welding apparatus which includes welding transformer T, and welding electrodes E and E'. A fuse or circuit breaker F is normally utilized in the power supply which may typically be 440 volt AC current.

Figure 3:
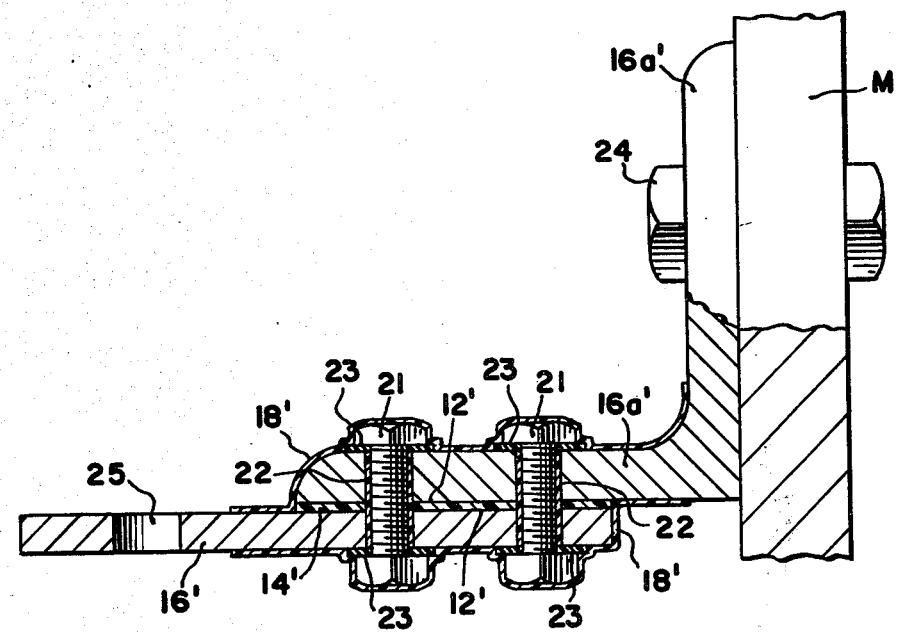
FIG. 3 is a cross-sectional view of a modified form of connector.

In FIG. 3, a modified form of the invention is disclosed in which the copper connector bar 16' has a similarly ground polished surface 12' and bolts to an angle iron 16a', as with insulated bolts 21, the member 16a' similarly being provided with a ground and polished surface 12'. Shim 14' of the character disclosed previously is sandwiched between surfaces 12' and is perforated to pass the bolts 21 and insulation tubes 22 which surround them. Insulation washers 23 are also provided and the assembly is provided with a similar insulating coating 18' by dipping it in an appropriate synthetic plastic bath, i.e. MICCROSOL. The member 16a' can bolt directly to the machine frame M as with bolts 24 and an opening 25 is provided in bar 16' for connection of an electric cable to the secondary S of the welding circuit.

While two embodiments of the invention have been described, it will be apparent to those skilled in the art that the disclosed embodiments may be modified. Therefore, the foregoing description is to be considered exemplary rather than limiting, and the true scope of the invention is that defined in the following claims.

What is claimed is:

1. In a welding circuit, including a welding transformer and welding electrodes connected by circuit wiring thereto; the improvement comprising a pair of slightly spaced electrically conductive metal blocks having flat opposed complementing facing surfaces with polished finishes, a relatively thin shim consisting entirely of electrically insulating synthetic plastic material of uniform thickness between one-half to one and one-quarter mils, clamped between said opposed facing surfaces to hold them spaced apart the thickness of said material and substantially filling the space therebetween to provide uniform dielectric properties across the space and normally uniformly electrically insulate said blocks from each other, the thickness of said shim being such that the shim destructs when the electric potential between said blocks exceeds a predetermined minimum electric potential, and conductor means for electrically connecting one of said blocks to said circuit and electrically connecting the other of said blocks to electrical ground to protect the operator.

2. The invention defined in claim 1 further comprising an electrical resistor of approximately 10–25 ohms resistance electrically connecting said blocks to each other.

3. The invention defined in claim 1 wherein said shim comprises a sheet of cellulose tri-acetate. bars completely around said shim to isolate it from atmosphere.

4. The invention defined in claim 1 wherein the block connected to said circuit connects to the secondary side of a circuit delivering DC current to the electrodes.

5. The invention defined in claim 1 wherein an insulated plastic coat is applied to the exterior of said bars completely around said shim to isolate it from atmosphere.

6. The system of claim 1 in which said shim is about 0.001 of an inch in thickness.

7. The system of claim 1 in which one of said bars is fabricated of copper and the other of angle iron, the angle iron being the bar which connects to ground.

8. The system of claim 1 in which the facing surfaces are uniformly substantially glass-like in terms of surface finish and are uniformly spaced apart.

* * * * *

UNITED STATES PATENT AND TRADEMARK OFFICE
CERTIFICATE OF CORRECTION

PATENT NO. : 4,152,576
DATED : May 1, 1979
INVENTOR(S) : Robert H. Blair

It is certified that error appears in the above—identified patent and that said Letters Patent are hereby corrected as shown below:

Column 4, lines 12 and 13, delete "bars completely around said shim to isolate it from atmosphere."

Signed and Sealed this

Seventh Day of August 1979

[SEAL]

Attest:

Attesting Officer

LUTRELLE F. PARKER
Acting Commissioner of Patents and Trademarks